(12) United States Patent
Lewis

(10) Patent No.: US 7,822,948 B2
(45) Date of Patent: Oct. 26, 2010

(54) APPARATUS, SYSTEM, AND METHOD FOR DISCONTIGUOUS MULTIPLE ISSUE OF INSTRUCTIONS

(75) Inventor: Russell Lee Lewis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 11/969,180

(22) Filed: Jan. 3, 2008

(65) Prior Publication Data
US 2009/0177868 A1 Jul. 9, 2009

(51) Int. Cl.
*G06F 9/38* (2006.01)
(52) U.S. Cl. ............................ 712/203; 712/216
(58) Field of Classification Search ................ 712/203, 712/216
See application file for complete search history.

(56) References Cited

U.S. PATENT DOCUMENTS

| | | | |
|---|---|---|---|
| 5,426,743 A | 6/1995 | Phillips et al. ............. 395/375 |
| 5,974,537 A | 10/1999 | Mehra ........................ 712/215 |
| 6,076,159 A | 6/2000 | Fleck et al. ................ 712/241 |
| 6,173,393 B1 * | 1/2001 | Palanca et al. ............. 712/224 |
| 6,298,435 B1 * | 10/2001 | Chan et al. ................. 712/217 |
| 6,609,190 B1 | 8/2003 | Kahle et al. ................ 712/214 |
| 6,748,522 B1 * | 6/2004 | Gregoire et al. ............ 712/227 |
| 7,185,177 B2 | 2/2007 | Pechanek ................... 712/205 |
| 2003/0149862 A1 * | 8/2003 | Kadambi .................... 712/217 |
| 2004/0154006 A1 | 8/2004 | Heishi et al. ............... 717/140 |
| 2006/0259738 A1 | 11/2006 | Hudepohl et al. ............ 712/34 |

* cited by examiner

*Primary Examiner*—Daniel Pan
(74) *Attorney, Agent, or Firm*—Kunzler Needham Massey & Thorpe

(57) ABSTRACT

An apparatus, system, and method are disclosed for discontiguous multiple issue of instructions. An assignment unit assigns a plurality of instruction blocks to a plurality of issue units. The plurality of issue units each comprises a renaming map that maps each architecturally visible register address to a rename register. Each issue unit maps each architecturally visible register in the decoded instruction to a register placeholder if the renaming map entry for that architecturally visible register is invalid else maps the architecturally visible register in the decoded instruction to a rename register if the rename register entry is valid. Each issue unit further receives predecessor mapping information from the renaming map of the issue unit's predecessor issue unit in response to the assignment unit identifying a relationship with the predecessor issue unit and the final mapping information being available from the predecessor issue unit.

20 Claims, 9 Drawing Sheets

APPARATUS, SYSTEM, AND METHOD FOR DISCONTIGUOUS MULTIPLE ISSUE OF INSTRUCTIONS

BACKGROUND OF THE INVENTION

1. Field of the Invention

This invention relates to instruction issue and more particularly relates to discontiguous multiple issue of instructions.

2. Description of the Related Art

Microprocessors typically function by executing a series of instructions organized in a program. Microprocessors are referred to hereinafter as processors. A processor may execute an instruction over one or more clock cycles. To increase the execution of instructions, some processors concurrently execute one or more instructions.

For example, a first and second instruction may be executed concurrently if the second instruction is not dependent on the first instruction. Unfortunately, the instructions of the program may be ordered to be executed sequentially. As a result, some sequential instruction groups may be difficult to execute concurrently. As a result, modern processors often execute instructions out of order to increase throughput, concurrently processing unrelated instructions.

In addition, modern processors may be configured to execute more than one instruction per clock cycle. Thus a first instruction may be executed while a later third instruction is executed out of order, followed by the execution of a second instruction.

Unfortunately, it is more difficult to issue multiple instructions. Issuing and executing multiple instructions per cycle requires significant hardware support to track and resolve dependencies, with the hardware requirements typically increasing with the square of the number of execution units.

SUMMARY OF THE INVENTION

From the foregoing discussion, there is a need for an apparatus, system, and method that discontiguously issue multiple instructions. Beneficially, such an apparatus, system, and method would perform multiple instruction issue without excessive additional hardware.

The present invention has been developed in response to the present state of the art, and in particular, in response to the problems and needs in the art that have not yet been fully solved by currently available multiple instruction issue methods. Accordingly, the present invention has been developed to provide an apparatus, system, and method for discontiguous multiple instruction issue that overcome many or all of the above-discussed shortcomings in the art.

The apparatus to issue instructions is provided with a plurality of modules configured to functionally execute the steps of assigning a plurality of instruction blocks, tracking dependencies, assigning a pointer, mapping register addresses, receiving predecessor mapping information, and receiving blocks of instructions. These modules in the described embodiments include a plurality of rename registers, an assignment unit, a plurality of issue units, and a dependency resolution/execution unit (DRE).

The plurality of rename registers each store data and assumes the address of an architecturally visible (AV) register. The assignment unit assigns a plurality of instruction blocks to the plurality of issue units. In addition, the assignment unit tracks dependencies between the instruction blocks. The assignment unit further assigns a pointer linking a predecessor instruction block with a successor instruction block when a dependency is identified between the predecessor and successor instruction blocks. The linked instruction blocks form a chain. The instructions of the instruction blocks reference AV registers.

The plurality of issue units each comprise a renaming map that maps each AV register address to a rename register. Each renaming map comprises a valid flag for each AV register address and a plurality of register placeholders. In addition, each issue unit is configured to each receive predecessor mapping information from the renaming map of the issue unit's predecessor issue unit in response to the assignment unit identifying a relationship with the predecessor issue unit and the final mapping information being available from the predecessor issue unit.

Each issue unit issues an instruction block to the DRE after all register placeholders in all pre-issued instructions have been changed to point to rename registers. The DRE receives instruction blocks from the plurality of issue units.

A computing system of the present invention is also presented. The system may be embodied in a computer. In particular, the system, in one embodiment, includes a memory, a north bridge and a processor.

The memory stores data and instructions. The north bridge communicates data and instructions. The processor includes a plurality of rename registers, an assignment unit, a plurality of issue units, and a DRE.

The plurality of rename registers each store data and assumes the address of an AV register. The assignment unit assigns a plurality of instruction blocks to the plurality of issue units. In addition, the assignment unit tracks dependencies between the instruction blocks. The assignment unit further assigns a pointer linking a predecessor instruction block with a successor instruction block when a dependency is identified between the predecessor and successor instruction blocks. The linked instruction blocks form a chain. The instructions of the instruction blocks reference AV registers.

The plurality of issue units each comprise a renaming map that maps each AV register address to a rename register. Each renaming map comprises a valid flag for each AV register address and a plurality of register placeholders. In addition, each issue unit is configured to each receive predecessor mapping information from the renaming map of the issue unit's predecessor issue unit in response to the assignment unit identifying a relationship with the predecessor issue unit and the final mapping information being available from the predecessor issue unit.

Each issue unit issues an instruction block to the DRE after all register placeholders in all pre-issued instructions have been changed to point to rename registers. The DRE receives instruction blocks from the plurality of issue units.

A method of the present invention is also presented for issuing instructions. The method in the disclosed embodiments substantially includes the steps to carry out the functions presented above with respect to the operation of the described apparatus and system. In one embodiment, the method includes assigning a plurality of instruction blocks, tracking dependencies, assigning a pointer, mapping register addresses, receding predecessor mapping information, and receiving blocks of instructions.

An assignment unit assigns a plurality of instruction blocks to a plurality of issue units. In addition, the assignment unit tracks dependencies between the instruction blocks. The assignment unit further assigns a pointer linking a predecessor instruction block with a successor instruction block when a dependency is identified between the predecessor and successor instruction blocks. The linked instruction blocks form a chain. The instructions of the instruction blocks reference AV registers.

The plurality of issue units each comprise a renaming map that maps each AV register address to a rename register. Each renaming map comprises a valid flag for each AV register address and a plurality of register placeholders. An issue unit receives a first instruction block from the assignment unit, sets each valid flag to false, pre-issues each instruction in the first instruction block by decoding each instruction.

In addition, the issue unit maps each AV register in the decoded instruction to a register placeholder if the renaming map entry for that AV register is invalid else maps the AV register in the decoded instruction to a rename register if the rename register entry is valid. Each issue unit further receives predecessor mapping information from the renaming map of the issue unit's predecessor issue unit in response to the assignment unit identifying a relationship with the predecessor issue unit and the final mapping information being available from the predecessor issue unit.

Each issue unit issues an instruction block to the DRE after all register placeholders in all pre-issued instructions have been changed to point to rename registers. The DRE receives instruction blocks from the plurality of issue units.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention assigns instruction blocks, tracks dependencies between the instruction blocks, and issues instructions to the DRE to increase instruction throughput. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute microcode programs stored on tangible storage devices, and/or execute programmed functions.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
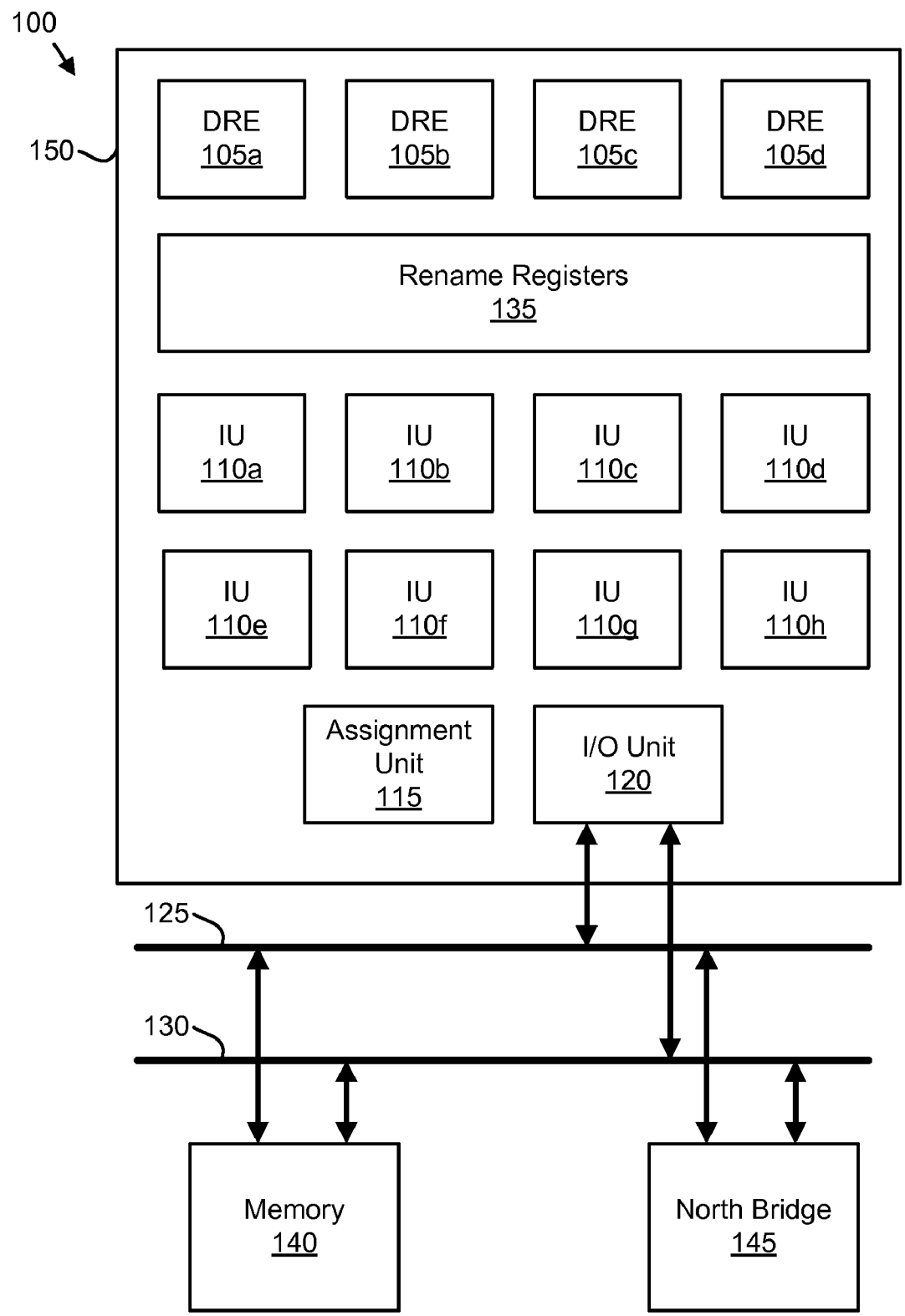
FIG. 1 is a schematic block diagram illustrating one embodiment of a computing system in accordance with the present invention.

FIG. 1 is a schematic block diagram illustrating one embodiment of a computing system 100 in accordance with the present invention. The system 100 includes a processor 150, a memory 140, a north bridge 145, a data bus 125, and an address bus 130. The processor 150 includes one or more DRE 105, one or more rename registers 135, one or more instruction units 110, assignment unit 115, and an input/output (I/O) unit 120. The processor 150, memory 140, and north bridge 145, may be configured as semiconductor devices.

The processor 150 addresses instructions in the memory 140 over the address bus 130. The memory 140 communicates the instructions to the processor 150 over the data bus 125 as is well known to those of skill in the art. The processor 150 executes the instructions. As used herein, data may refer to data, instructions, and addresses.

The north bridge 145 may communicate data to the memory 140 and the processor 150. In one embodiment, the north bridge 145 communicates with the south bridge. The south bridge may communicate with storage devices, network devices, and the like.

The processor 150 executes instructions received from the memory 140 and the north bridge 145. The I/O unit 120 receives data from the memory 140 and the north bridge 145. In addition, the I/O unit 120 communicates data to the memory 140 and the north bridge 145. The assignment unit 115 assigns instruction blocks to instruction units 110 as will be described hereafter.

The instructions include references to AV registers. For example, an instruction set for the processor 150 may allow data to be stored in one of 32 AV registers. The rename registers 135 each store data and assume the address of an AV register. Continuing the example above, the rename registers 135 may comprise 128 registers that may store data directed to the AV registers. The AV registers may be virtual registers, with the data stored in rename registers 135 at assume the addresses of AV registers. For simplicity the rename registers 128 are shown as a single unit. The rename registers 135 may be implemented as a bank of semiconductor memory registers as is well known to those of skill in the art.

The instruction units 110 may issue multiple instructions to the DRE 105 during a clock cycle. Such multiple issues have required significant hardware resources in the past. The present invention supports the discontiguous issue of multiple instructions with reduced hardware resources.

The assignment unit 115 assigns a plurality of instruction blocks to the plurality of issue units 110. In addition, the assignment unit 115 tracks dependencies between the instruction blocks. The assignment unit 115 further assigns a pointer linking a predecessor instruction block with a successor instruction block when a dependency is identified between the predecessor and successor instruction blocks. The linked instruction blocks form a chain. The instructions of the instruction blocks reference the AV registers.

The plurality of issue units 110 each comprises a renaming map. Each issue unit 110 is configured to each receive predecessor mapping information from the renaming map of the issue unit's predecessor issue unit 110 in response to the assignment unit 115 identifying a relationship with the predecessor issue unit 110 and final mapping information being available from the predecessor issue unit 110.

The issue unit 110 issues an instruction block to one of the DRE 105 after all register placeholders in all pre-issued instructions have been changed to point to rename registers 135. The DRE 105 receives instruction blocks from the plurality of issue units 110. In one embodiment the DRE 105 hold each instruction until each rename register with an input of the instruction contains valid data. In addition, the DRE 105 may execute the instruction when all inputs are valid. The DRE 105 write may the result, if any, in a rename register chosen during the pre-issue stage to hold the result.

Figure 2:
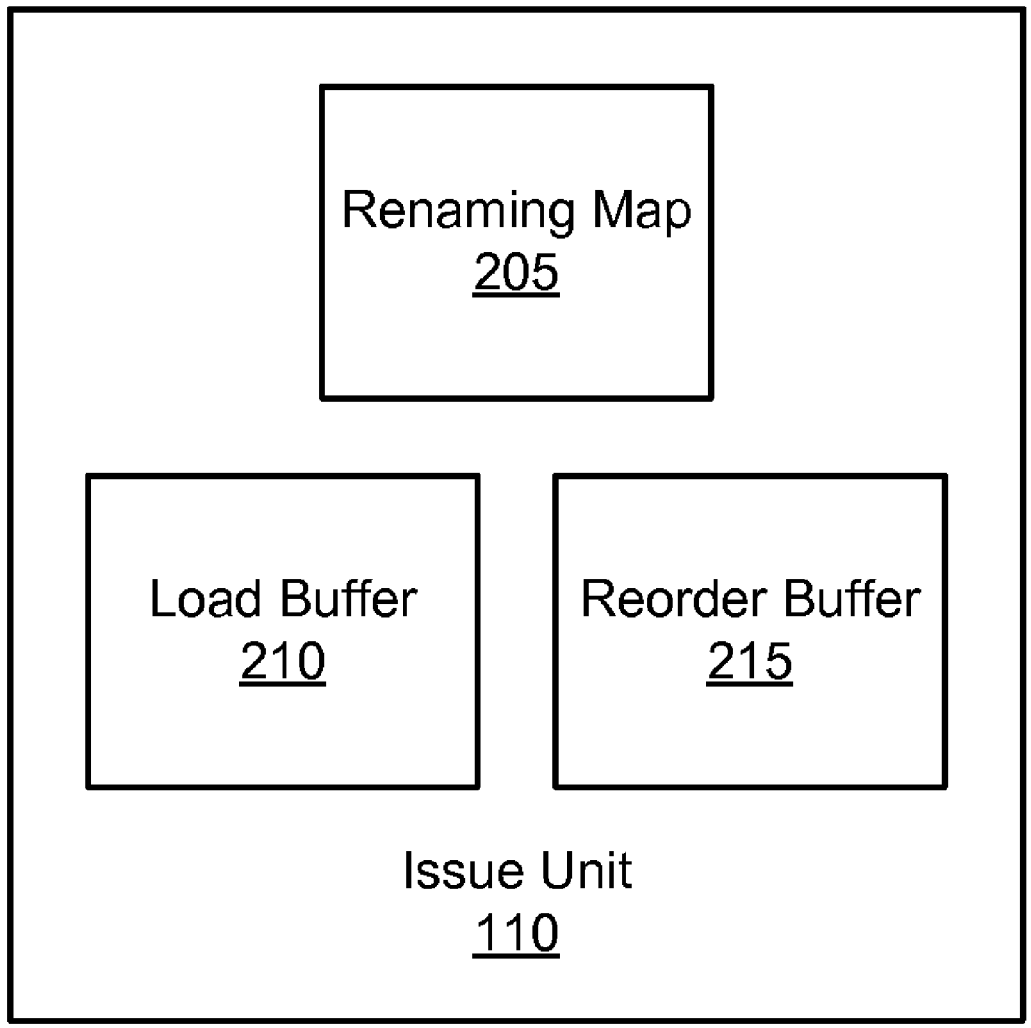
FIG. 2 is a schematic block diagram illustrating one embodiment of an issue unit of the present invention.

FIG. 2 is a schematic block diagram illustrating one embodiment of an issue unit 110 of the present invention. The issue unit 110 is illustrative of each of the issue units 110 of FIG. 1. In the depicted embodiment, the issue unit 110 includes a renaming map 205, a load buffer 210, and a reorder buffer 215. The description of the issue unit 110 refers to elements of FIG. 1, like numbers referring to like elements.

The renaming map 205 maps each AV register address to a rename register 135 as will be described hereafter. The issue unit 110 issues a load request and/or store request to the load buffer 210. The load request directs that data be loaded into an AV register from the memory 140 and/or through the north bridge 145 from another device such as a hard disk drive. The store request directs that data be copied from an AV register to the memory 140 and/or a device in communication with the north bridge 145. The load buffer 210 may reorder data as the data is loaded and/or prior to storing the data.

The reorder buffer 215 manages the out-of-order execution of instructions so that the execution is logically equivalent to in-order execution. For example, the reorder buffer 215 may hold the execution of the second successor instruction until results from a first predecessor instruction are available.

Figure 3:
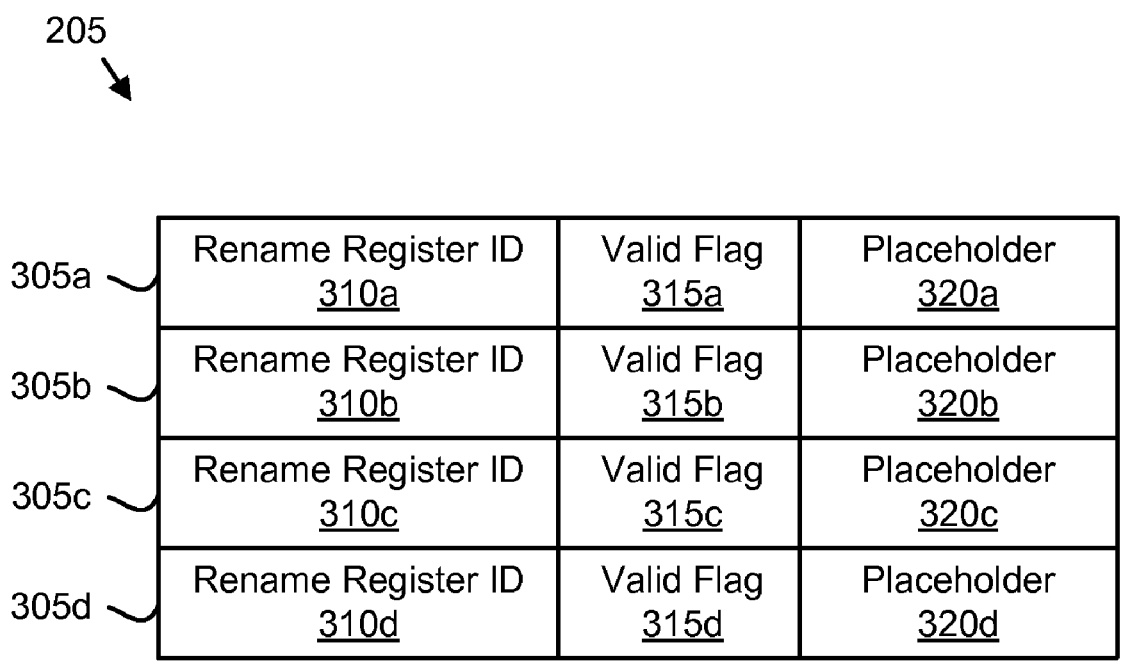
FIG. 3 is a schematic block diagram illustrating one embodiment of a renaming map of the present invention.

FIG. 3 is a schematic block diagram illustrating one embodiment of a renaming map 205 of the present invention. The renaming map 205 is the renaming map of FIG. 2. The description of the renaming map 205 refers to elements of FIGS. 1-2, like numbers referring to like elements.

In one embodiment, the renaming map 205 includes one or more entries 305. In a certain embodiment, the renaming map 205 includes one entry 305 for each rename register 135. Each entry 305 includes a rename register identifier (ID) 310, a valid flag 315 and a placeholder ID 320. The rename register ID 310 may store an AV register address. Thus the rename register ID 310 associates a rename register 135 with an AV register. The valid flag 315 indicates whether the mapping stored in the rename register ID field is valid. The valid flag 315 may be set to true such as a binary one (1) value when the mapping is valid and to false such as a binary zero (0) when the mapping is invalid.

In one embodiment, the placeholder register 320 is an identifier that may be used in place of a rename register 135 until the rename register 135 is associated with an AV register. The placeholder register 320 may be a virtual register and does not physically store data.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
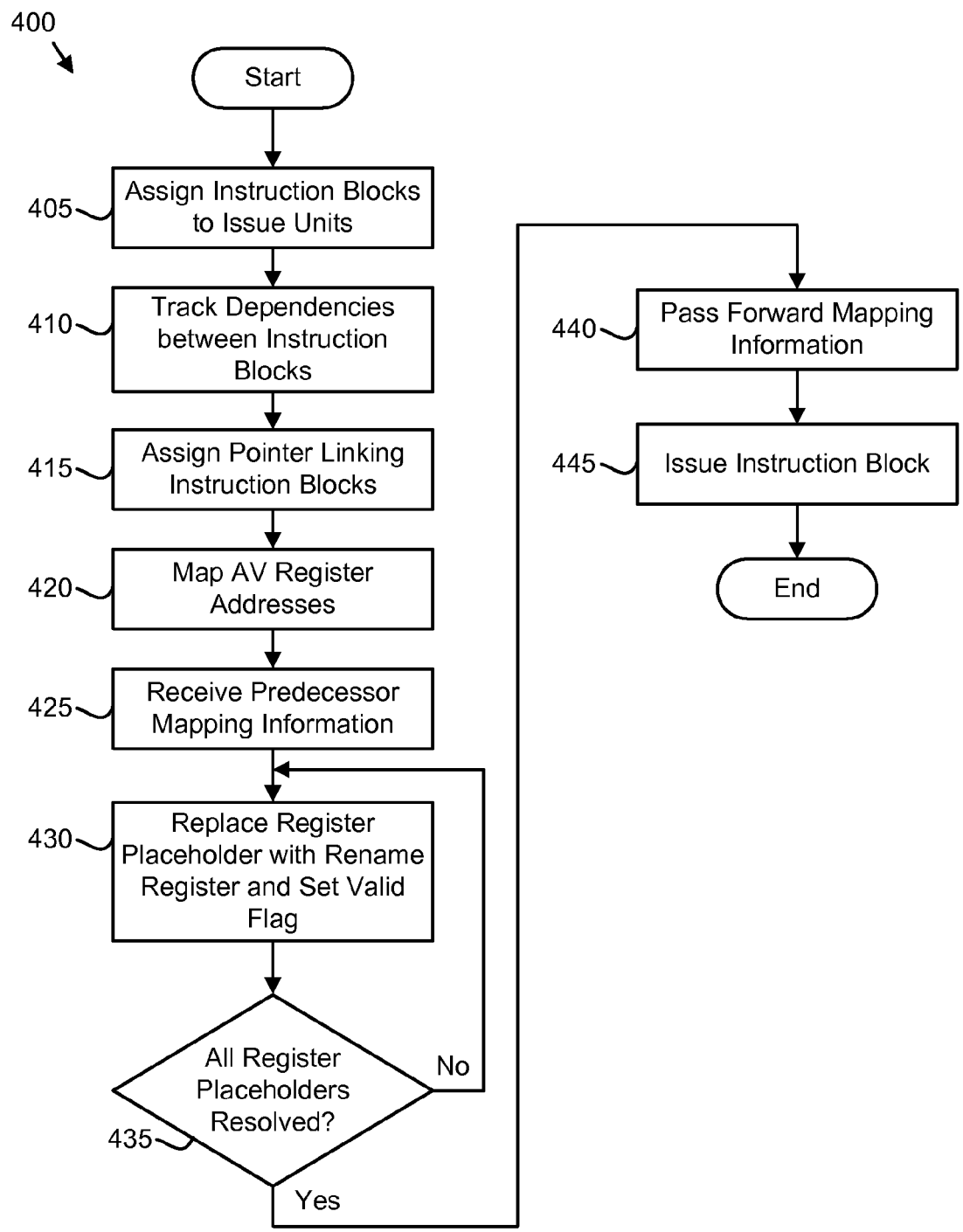
FIG. 4 is a schematic flow chart diagram illustrating one embodiment of a multiple issue method of the present invention.

FIG. 4 is a schematic flow chart diagram illustrating one embodiment of a multiple issue method 400 of the present invention. The method 400 substantially includes the steps to carry out the functions presented above with respect to the operation of the described apparatus and system of FIGS. 1-3. In one embodiment, the method 500 is implemented with a microcode product comprising a semiconductor instruction storage having a microcode program. The microcode program may be integrated into a computing system, such as the processor 150 of the computer system 100, wherein the program in combination with the computing system 100 is capable of performing the method 400.

The method 400 begins and the assignment unit 115 assigns 405 a plurality of instruction blocks to a plurality of issue units 110. For example, the assignment unit 115 may assign a first instruction block to a first issue unit 110*a* and a second instruction block to a second issue unit 110*b*. The assignment unit 115 may divide instructions of a program into instruction blocks based on a heuristic. For example, the assignment unit 115 may create an instruction block of the instructions preceding a branch instruction and/or a write instruction.

In one embodiment, the assignment unit 115 may assign 405 each of a plurality of issue units 110 a discrete instance of an instruction block comprising a loop. For example, a third instruction block may comprise an instruction loop that may be repeated a plurality of times such as a WHILE loop as is well known to those of skill in the art. The assignment module 215 may assign 405 a first instance of the third instruction block to the first issue unit 110*a*, a second instance of the third instruction block to the second issue unit 110*b*, and a third instance of the third instruction block to a third issue unit 110*c*. In a certain embodiment, the third instance of the third instruction block is a successor instruction block to the second instance of the third instruction block, and a second instance of the third instruction block is a successor instruction block to the first instance of the third instruction block.

The assignment unit 115 may assign 405 a speculative instruction block to an issue unit 110. The speculative instruction block is not a known successor of an instruction block in a current chain comprising a currently issued instruction block. In one embodiment, the assignment unit 115 employs a heuristic to speculatively assign 405 the speculative instruction block. For example, the heuristic may direct the speculative assignment 405 of instruction blocks that begin with a branch target.

The assignment unit 115 may speculatively assign 405 a return instruction block to an issue unit 110. The return instruction block may include the destination instruction of one or more branch instructions. For example, if the assignment unit 115 identifies the return instruction block, the assignment unit 115 may assign 405 to return instruction block to an issue unit 110 and later link the return instruction block to a predecessor instruction block. In one example, the assignment unit 115 may speculatively issue a return instruction block comprising a current instruction when the processor 150 receives an interrupt and/or system call. Although the assignment unit 115 cannot determine which instruction block will ultimately branch to the return instruction block, the return instruction block will be available when the processor 150 completes handling the interrupt and/or system call. Thus the handling of interrupts and system calls can be accelerated.

The assignment unit 115 tracks 410 dependencies between the instruction blocks. For example, if the second instruction block is configured to be executed following the first instruction block, the assignment unit 115 may record that the first instruction block is a predecessor instruction block to the second instruction block and that the second instruction block is a successor to the first instruction block. In one embodiment, the assignment unit 115 may track 410 dependencies between instruction blocks until each instruction block is executed or terminated.

The assignment unit 115 further assigns 415 a pointer linking a predecessor instruction block with a successor instruction block when a dependency is identified between the predecessor and successor instruction blocks as will be shown hereafter. The linked instruction blocks form a chain. In one embodiment, the pointer indicates where a predecessor instruction block's mapping information should be sent after the predecessor instruction block's instructions have been issued.

In one embodiment, the assignment unit 115 assigns 415 a pointer linking a speculative predecessor instruction block with a speculative successor instruction block when a dependency is identified between the speculative predecessor and speculative successor instruction blocks as will be described hereafter. The linked instruction blocks form a speculative chain.

The issue unit renaming maps 205 each map 420 AV register address in an instruction block to a rename register 135. In one embodiment, an issue unit 110 receives a first instruction block from the assignment unit 115. The issue unit 110 sets each valid flag 315 in the renaming map 205 to false. The issue unit 110 then pre-issues each instruction in the first instruction block by decoding each instruction. The issue unit 110 may pre-issue an instruction by referring an AV register referenced in the instruction to a register placeholder 320. The issue unit 110 may refer the AV register to the register placeholder 320 if and only if there are no instructions earlier in the instruction block which write to the AV register. In one embodiment, the issue unit 110 refers the AV register to a register placeholder 320 by writing a register placeholder ID to placeholder register 320 in a renaming map entry 305 for the AV register.

In one embodiment, issue unit 110 pre-issues the instruction by referring an AV register to a rename register 135. The issue unit 110 may refer the AV register the rename register 135 if and only if the rename register 135 is the rename register 135 which is the assigned destination rename register 135 for the most recent write to the AV register in the instruction block.

In one embodiment, semiconductor logic decodes each instruction. The semiconductor logic may include a sequencer that performs one or more functions in response to each instruction. For example, bits in the instruction may provide inputs to a sequencer state machine. The sequencer state machine may advance through a series of states and assert control lines in response to the instruction bits as is well known to those of skill in the art.

In addition, the issue unit 110 maps 420 each AV register in the decoded instruction to a register placeholder 320 if the renaming map entry 305 for that AV register is invalid. In one embodiment, the renaming map entry 305 is invalid if the invalid flag 315 is false. If the renaming map entry 305 is valid, the issue unit 110 maps the AV register in the decoded instruction to the rename register 135.

In one embodiment, the issue unit 110 selects a rename register 135 to contain the results of an instruction. The issue unit 110 may update the renaming map 205 to map the AV register to the rename register 135. In addition, the issue unit 110 may mark the rename register entry 305 as valid if the instruction writes to an AV register. In one embodiment, the issue unit 110 marks the rename register entry 305 as valid by setting the valid flag 315 for the rename register entry 305 to true.

The issue unit 110 further receives 425 predecessor mapping information from the renaming map 205 of the issue unit's predecessor issue unit 110 in response to the assignment unit 115 identifying a relationship with the predecessor issue unit and final mapping information being available from the predecessor issue unit 110. The predecessor issue unit 110 may send mapping information although the issue unit 110 is pre-issuing instructions.

In one embodiment, the final mapping information includes a mapping of at least one of the AV registers to a respective rename register 135. The mapping may reflect the correct mappings upon completion of the predecessor mapping information's block of instructions. For example, if the issue unit issues a first instruction block and resolves the rename register values for AV registers modified by the first instruction block, the predecessor issue unit 110 may communicate the final mapping information including valid rename registers 135 for the AV registers to the successor issue unit 110.

In one embodiment, when the issue unit 110 receives the predecessor mapping information, the successor issue unit 110 updates the renaming map 205 by updating a renaming map entry 305 for which the predecessor mapping information includes a valid mapping and the successor issue unit does not have a valid mapping. In addition, the issue unit 110 may update the renaming map 205 by recording the mapping information in the successor issue unit renaming map 205, and marking the renaming map entry 305 as valid such as by setting the valid flag 315 to true.

When receiving predecessor mapping information, the issue unit 110 may update each pre-issued instruction that refers to a register placeholder 320 where the received predecessor mapping information specifies a mapping for the AV register mapped to the register placeholder 320. In addition, the issue unit 110 may update the pre-issued instruction by modifying the pre-issued instruction to point to the rename register 135 specified in the predecessor mapping information. If all instructions in the instruction block have already been pre-issued and a successor issue unit 110 is identified, the issue unit 110 passes 440 forward any new mapping information to a successor issue unit 110. The issue unit 110 may send the new mapping information although the successor issue unit 110 is pre-issuing instructions.

Each issue unit 110 issues 445 a block of instructions to one of the plurality of DRE 105 after all register placeholders 320 in all pre-issued instructions have been changed to point to rename registers 135 and the method 500 ends. In one embodiment, the issue unit 110 issues 445 a single instruction to a DRE 105 when the single instruction no longer refers to any placeholder registers 320. The issue unit 110 may issue the single instruction even though the issue unit 110 may still have some other instructions which refer to placeholder registers 320.

The method 400 allows the discontiguous issue of multiple instructions. Using the method 400, the processor 150 may issue and execute more than one instruction per clock cycle. In addition, the hardware required to support multiple issue may be reduced.

Figure 5:
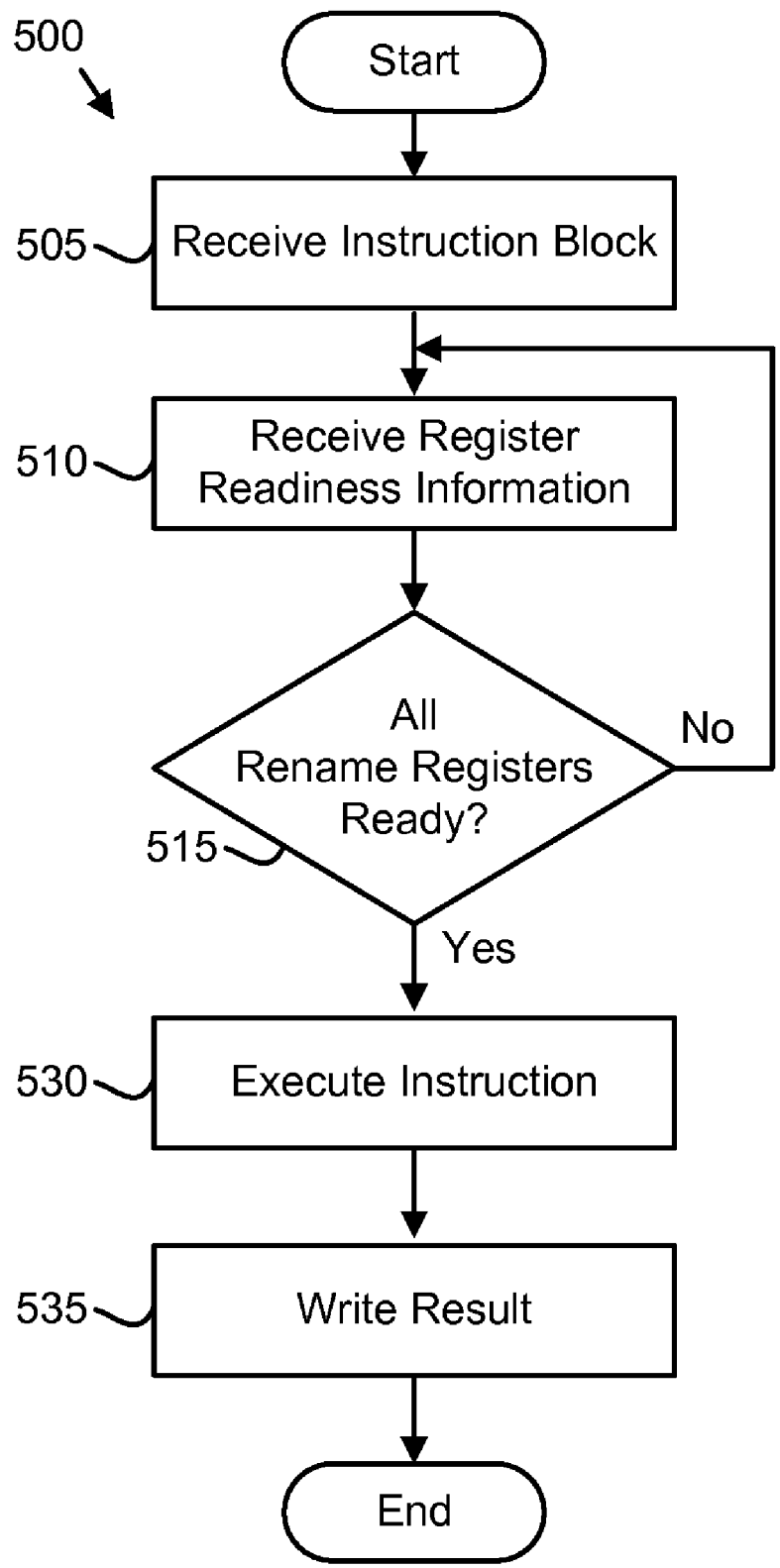
FIG. 5 is a schematic flow chart diagram illustrating one embodiment of a multiple execution method of the present invention.

FIG. 5 is a schematic flow chart diagram illustrating one embodiment of a multiple execution method 500 of the present invention. The method 500 substantially includes the steps to carry out the functions presented above with respect to the operation of the described apparatus and system of FIGS. 1-3. In one embodiment, the method 500 is implemented with a microcode product comprising a semiconductor instruction storage having a microcode program. The microcode program may be integrated into a computing system, such as the processor 150 of the computer system 100, wherein the program in combination with the computing system 100 is capable of performing the method 500.

The method 500 begins and a DRE 105 of the plurality of DREs 105 receives 505 an instruction block from an issue unit 110. Any issue unit 110 may communicate the instruction block to any DRE 105. Each instruction in an instruction block includes information about the operation that must be performed, the input rename registers 135 if any, and the destination rename register 135 if any. All rename registers 135 are identified by a renaming register ID 310, and the DRE 105 is entirely unaware of which renaming registers 135 represent which AV registers. Thus, the instruction block is never sent to the DRE 105 until all of placeholders 320 referring to AV registers have been replaced with the appropriate renaming register IDs 310.

In one embodiment, the DRE 105 determines 515 if all the rename registers 135 which are inputs to a given instruction are ready. For example, the DRE may check the valid flag 315 for each rename register 135. If all the rename registers 135 which constitute the input for an instruction are not ready, the DRE 105 continues to receive 510 readiness information. The DRE 105 may hold the instruction until each rename register 135 with an input to the instruction contains valid data. For example, the DRE 105 may hold an add instruction until two rename registers 135 holding the inputs for the add instruction contain valid data.

If the DRE 105 determines 515 that all the rename registers 135 are ready, the DRE 105 may execute 530 the instruction as is well known to those of skill in the art. Continuing the example above, the DRE 105 may add values stored in the two rename registers 135.

In one embodiment, the issue unit 110 may issue 445 and the DRE 105 may execute 530 an instruction block of a mis-predicted branch. For example, if the assignment unit 115 determines that a fourth instruction block will not be executed, the issue unit 110 may speculatively issue 445 the fourth instruction block. Similarly the DRE 105 may speculatively execute 530 instructions of the fourth instruction block. Thus the results of the fourth instruction block may be available if needed.

In one embodiment, the DRE 105 writes 535 a result, if any, to a rename register 135. The rename register 135 may be chosen during the pre-issue to hold the result. In one embodiment, the DRE 105 writes 535 the result to the rename register 135 and sets the valid flag 315 for the rename register to true.

The method 600 resolves rename register values and executes instructions employing the rename registers 135. In addition, the method 600 allows instruction blocks to be issued 445 before all rename register values in the instruction blocks are valid.

Figure 6:
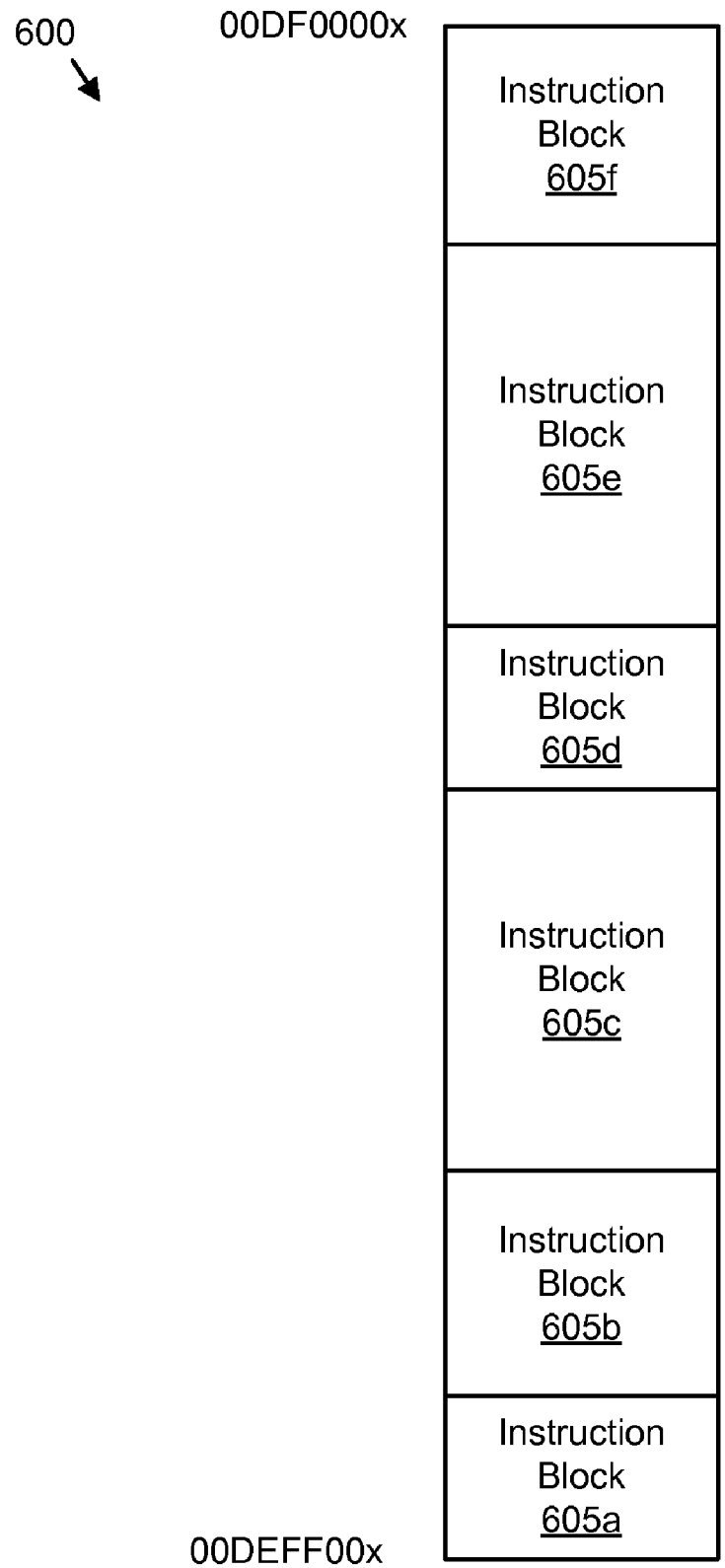
FIG. 6 is a schematic block diagram illustrating one embodiment of instructions of the present invention.

FIG. 6 is a schematic block diagram illustrating one embodiment of instructions 600 of the present invention. The instructions 600 may be embodied in a computer program that is executed by the processor 150 of FIG. 1. The description of the instructions 600 refers to elements of FIGS. 1-5, like numbers referring to like elements.

As depicted, the instructions are stored between hexadecimal addresses 00DF0000x and 00DEFF00x. In one embodiment, the assignment unit 115 organizes the instructions 600 into a plurality of instruction blocks 605. The assignment unit 115 may employ a heuristic to organize the instruction blocks 605. For example, a heuristic may direct that no instruction block 605 may exceed 20 instructions in length. Similarly, the heuristic may direct that any branch instruction ends an instruction block 605.

Figure 7:
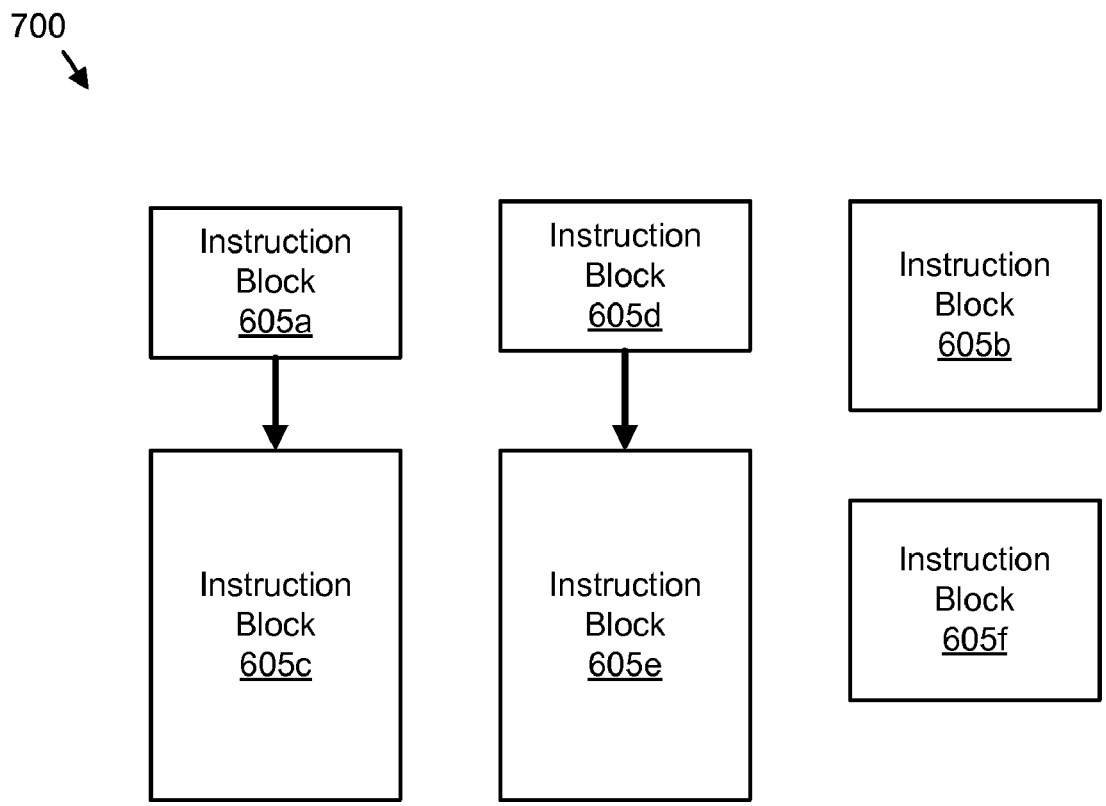
FIG. 7 is a schematic block diagram illustrating one embodiment of linked instruction blocks of the present invention.

FIG. 7 is a schematic block diagram illustrating one embodiment of linked instruction blocks 700 of the present invention. The instruction blocks 605 of FIG. 6 are shown organized with dependencies. For example, the assignment unit 115 may identify a dependency between a first instruction block 605a and a third instruction block 605c. The assignment unit 115 may assign 415 a pointer that links the first instruction block 605a with the third instruction block 605c. Similarly, the assignment unit 115 may assign 415 a pointer linking a fourth instruction block 605d with a fifth instruction block 605e. If the assignment unit 115 does not identify a predecessor instruction block and/or a successor instruction block for an instruction block, the assignment unit 115 may not link the instruction block 605. For example, a second and sixth instruction blocks 605*b*, 605*f* may not be linked if the assignment module 115 does not identify a predecessor instruction block and/or a successor instruction block for the second and sixth instruction blocks 605*b*, 605*f*.

Figure 8:
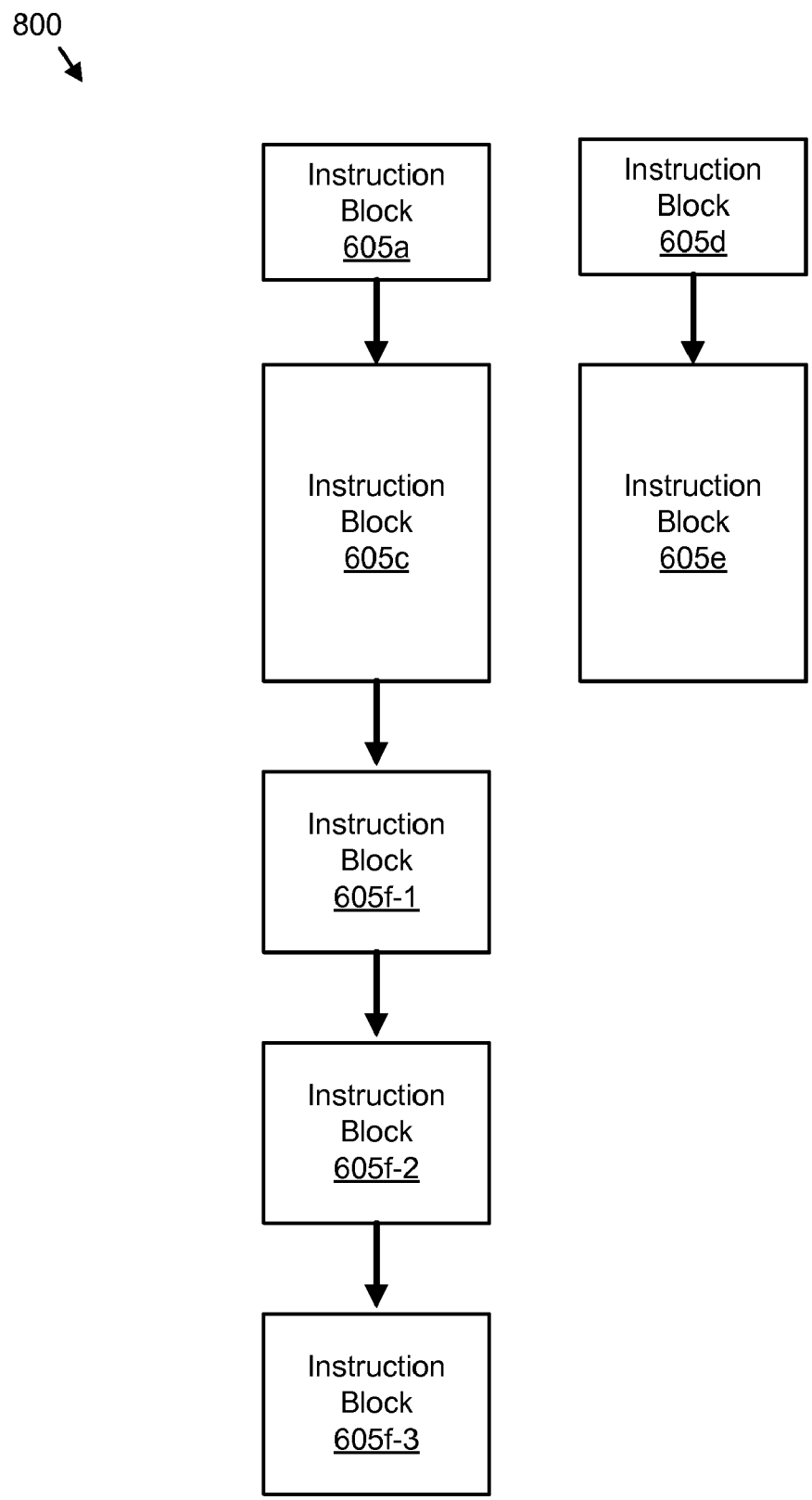
FIG. 8 is a schematic block diagram illustrating one alternate embodiment of linked instruction blocks of the present invention.

FIG. 8 is a schematic block diagram illustrating one alternate embodiment of linked instruction blocks 800 of the present invention. The instruction blocks 605 of FIGS. 6 and 7 are shown after the assignment unit 115 has identified additional dependencies. For example, the assignment unit 115 may determine that the sixth instruction block 605*f* is a successor to the third instruction block 605*c* and assign a pointer from the third instruction block 605*c* to the sixth instruction block 605*f*.

In the depicted embodiment, the assignment unit 115 further determines that at least three instances of the sixth instruction block 605*f* may be executed. Thus the assignment unit 115 links the third instruction block 605*c* to of first instance of the sixth instruction block 605*f*-1. In addition, the assignment unit 115 links the first instance of the sixth instruction block 605*f*-1 to a second instance of the sixth instruction block 605*f*-2 and links the second instance of sixth instruction block 605*f*-2 to a third instance of the sixth instruction block 605*f*-3.

The linked instruction blocks 605*a*, 605*c*, 605*f*-1, 605*f*-2, 605*f*-3 may form a speculative chain. A speculative chain is a chain of instruction blocks 605 where it is not yet certain that the first instruction block 605*a* will ever execute, but it is certain that if the first instruction block 605*a* executes, all of the other instruction blocks 605 in the chain will execute in the order given. The assignment unit 115 may assign 415 a pointer linking a speculative predecessor instruction block with a speculative successor instruction block when a dependency is identified between the speculative predecessor and speculative successor instruction blocks. Thus although the assignment unit 115 is not certain that the first instruction block 605*a* will ever run, the assignment unit 115 is certain that if the first instruction block 605*a* runs, it will be followed by 605*c*, and at least three instances of the sixth instruction block 605*f*.

Figure 9:
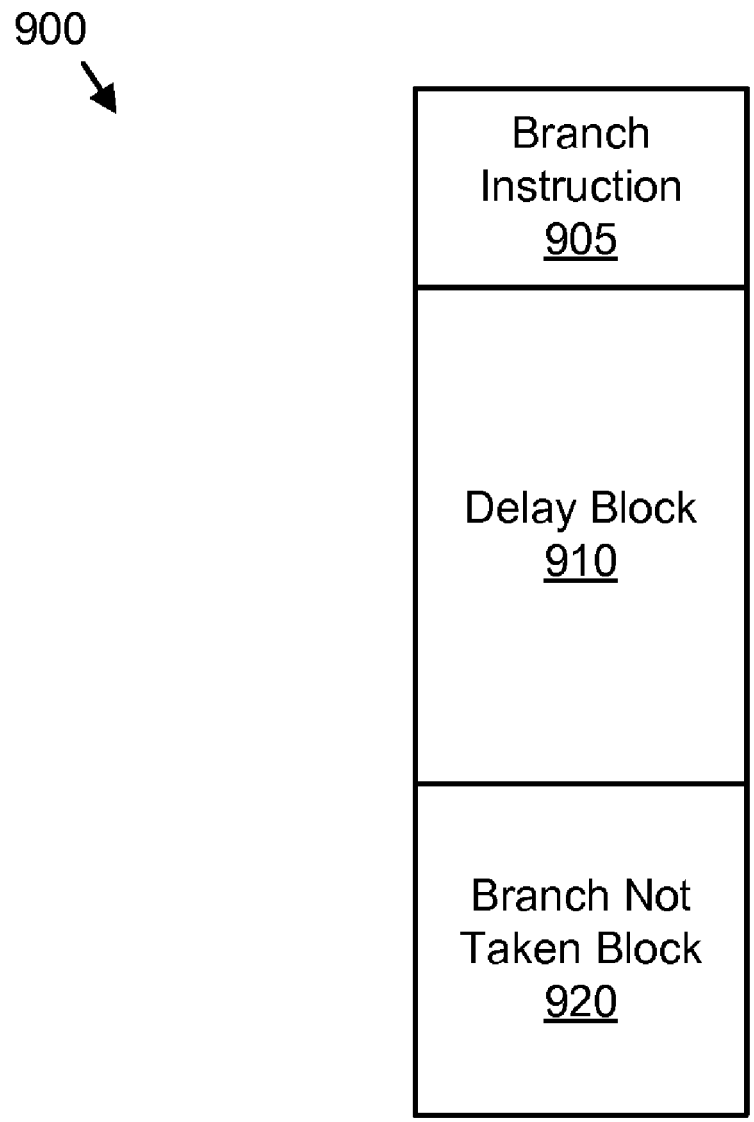
FIG. 9 is a schematic block diagram illustrating one embodiment of a delay block of the present invention.
Figure 9:
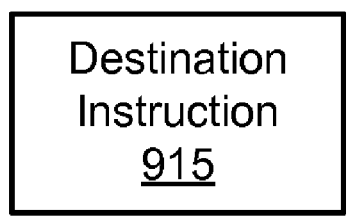

FIG. 9 is a schematic block diagram illustrating one embodiment of a delay block 900 of the present invention. The delay block 900 may be embodied in instructions 600 of FIG. 6. In one embodiment, the issue unit 110 receives a branch instruction 905 and a destination instruction 915. The branch instruction 905 may specify a condition. For example, a branch instruction 905 may specify the condition that a first AV register is equal to a second AV register. If the first AV register is equal to the second AV register, the processor at 150 must execute the destination instruction 915. If the first AV register is not equal to the second AV register, the processor 150 must continue to execute code at the next instruction in a branch not taken block 920 after the branch delay block 910.

However, the processor 150 may require multiple clock cycles to determine if the first AV register is equal to the second AV register. In one embodiment, the issue unit 110 queues the branch instruction 905, a delay block 910 of at least two instructions, the next instruction in the branch not taken block 920, and the destination instruction 915 for the branch instruction 905. The delay block instructions are queued to execute before the branch not taken block 920 and destination instruction 915 to increase instruction throughput.

The issue unit 110 may issue 445 and the DRE 105 may execute 530 the delay block 910 while the DRE 105 determines if the destination instruction 915 will be executed. Thus the issue unit 110 and DRE 105 are more fully utilized.

The present invention assigns instruction blocks, tracks dependencies between the instruction blocks, and issues instructions to the DRE 105 to reduce instruction latency. Thus more instructions may be issued and completed each clock cycle. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A processor, the processor comprising:

a plurality of rename registers each configured to store data and to assume the address of an architecturally visible (AV) register;

an assignment unit configured to assign a plurality of blocks of instruction (instruction blocks) to a plurality of issue units, wherein a branch instruction ends an instruction block and each instruction block does not exceed a specified number of instructions in length, track dependencies between the instruction blocks, and assign a pointer linking a predecessor instruction block with a successor instruction block when a dependency is identified between the predecessor and successor instruction blocks, the linked instruction blocks forming a chain and instructions of the instruction blocks referencing AV registers;

the plurality of issue units each comprising a renaming map that maps each AV register address to a rename register and comprises a valid flag for each AV register address and a plurality of register placeholders and configured to each receive predecessor mapping information from the renaming map of the issue unit's predecessor issue unit in response to the assignment unit identifying a relationship with the predecessor issue unit and final mapping information being available from the predecessor issue unit and issue an instruction block to a dependency resolution/execution unit after all register placeholders in all pre-issued instructions have been changed to point to rename registers; and a dependency resolution/execution unit configured to receive instruction blocks from the plurality of issue units.

2. The processor of claim 1, wherein each issue unit is configured to receive a first instruction block from the assignment unit, set each valid flag to false, pre-issue each instruction in the first instruction block by decoding each instruction and map each AV register in the decoded instruction to a register placeholder if the renaming map entry for that AV register is invalid else map the AV register in the decoded instruction to a rename register if the rename register entry is valid.

3. The processor of claim 2, wherein each issue unit is further configured to select a rename register to contain the results of the instruction, update the renaming map to map the AV register to the rename register, and mark the rename register entry as valid if the instruction writes to an AV register.

4. The processor of claim 3, the dependency resolution/execution further configured to hold each instruction until each rename register with an input of the instruction contains valid data, execute the instruction when all inputs are valid, and write the result, if any, in a rename register chosen during the pre-issue stage to hold the result.

5. The processor of claim 2, wherein pre-issuing said each instruction further refers an AV register to a register placeholder if and only if there are no instructions earlier in the instruction block which write to the AV register.

6. The processor of claim 5, wherein the pre-issued instruction refers an AV register to a rename register if and only if the rename register is the rename register which is an assigned destination rename register for the most recent write to the AV register in the instruction block.

7. The processor of claim 1, wherein the final mapping information comprises a mapping of at least one of the AV registers to a respective rename register, the mapping reflecting the correct mappings upon completion of the predecessor mapping information's block of instructions, receiving predecessor mapping information that update the successor issue unit's renaming map by updating a renaming map entry for which the predecessor mapping information includes a valid mapping and the successor issue unit does not have a valid mapping, recording the mapping information in the successor issue unit renaming map, and marking the renaming map entry as valid.

8. The processor of claim 1, wherein receiving predecessor mapping information further comprises updating each pre-issued instruction that refers to a register placeholder where the received predecessor mapping information specifies a mapping for the AV register, updating the pre-issued instruction by modifying the pre-issued instruction to point to the rename register specified in the predecessor mapping information, and, if all instructions in the instruction block are pre-issued and the successor issue unit is identified, passing forward any new register mapping information to a successor issue unit.

9. The processor of claim 1, wherein writing the dependency resolver/execution unit writes the result to the rename register and sets the valid flag for the rename register to true.

10. The processor of claim 1, each issue unit further configured to issue a single instruction to the dependency resolver/execution unit when the single instruction no longer refers to any placeholder registers.

11. The processor of claim 1, wherein the assignment unit may assign each of a plurality of issue units a discrete instance of an instruction block comprising an instruction loop.

12. The processor of claim 1, wherein each issue unit is further configured to queue a branch instruction, a delay block of at least two instructions, and a destination instruction for the branch instruction wherein the delay block instructions are queued to execute before the destination instruction.

13. The processor of claim 1, wherein the assignment unit is further configured to speculatively assign a return instruction block to an issue unit.

14. The processor of claim 1, wherein the assignment unit is further configured to assign a speculative instruction block to an issue unit, wherein the speculative instruction block is not a known successor of an instruction block in a current chain comprising a current instruction block.

15. The processor of claim 1, wherein the assignment unit is further configured to assign a pointer linking a speculative predecessor instruction block with a speculative successor instruction block when a dependency is identified between the speculative predecessor and speculative successor instruction blocks, the linked instruction blocks forming a speculative chain.

16. A microcode product comprising semiconductor instruction storage having a microcode program, wherein the microcode program when executed by processor semiconductor logic causes the processor semiconductor logic to:

assign a plurality of blocks of instructions (instruction blocks) to a plurality of issue units, wherein a branch instruction ends an instruction block and each instruction block does not exceed a specified number of instructions in length;

track dependencies between the instruction blocks;

assign a pointer linking a predecessor instruction block with a successor instruction block when a dependency is identified between the predecessor and successor instruction blocks, the linked instruction blocks forming a chain and instructions of the instruction blocks referencing AV registers;

map each AV register address in a renaming map to a rename register, each of the plurality of issue units comprising a renaming map, each renaming map comprising a valid flag for each AV register address and a plurality of register placeholders, wherein each issue unit is configured to receive a first instruction block from the assignment unit, set each valid flag to false, pre-issue each instruction in the first instruction block by decoding the instruction, and map each AV register in the decoded instruction to a register placeholder if the renaming map entry for that AV register is invalid else map the AV register in the decoded instruction to a rename register if the rename register entry is valid;

receive predecessor mapping information from the renaming map of the issue unit's predecessor issue unit in response to the assignment unit identifying a relationship with the predecessor issue unit and final mapping information being available from the predecessor issue unit;

issue an instruction block to a dependency resolution/execution unit after all register placeholders in all pre-issued instructions have been changed to point to rename registers; and receive an instruction block from at least one issue unit.

17. The microcode product of claim 16, wherein each issue unit is configured to receive a first instruction block from the assignment unit, set each valid flag to false, pre-issue each instruction in the first instruction block by decoding each instruction and map each AV register in the decoded instruction to a register placeholder if the renaming map entry for that AV register is invalid else map the AV register in the decoded instruction to a rename register if the rename register entry is valid, and wherein pre-issuing said each instruction further refers an AV register to a register placeholder if and only if there are no instructions earlier in the instruction block which write to the AV register and the pre-issued instruction refers an AV register to a rename register if and only if the rename register is the rename register which is an assigned destination rename register for the most recent write to the AV register in the instruction block.

18. A computing system, the system comprising:
a memory configured to store data and instructions;
a north bridge configured to communicate data and instructions; and
a processor comprising
a plurality of rename registers configured to store data and to assume the address of an AV register;
an assignment unit configured to assign a plurality of blocks of instructions (instruction blocks) to a plurality of issue units, wherein a branch instruction ends an instruction block and each instruction block does not exceed a specified number of instructions in length, track dependencies between the instruction blocks, and assign a pointer linking a predecessor instruction block with a successor instruction block when a dependency is identified between the predecessor and successor instruction blocks, the linked instruction blocks forming a chain and instructions of the instruction blocks referencing AV registers;

the plurality of issue units each comprising a renaming map that maps each AV register address to a rename register and comprises a valid flag for each AV register address and a plurality of register placeholders and configured to each receive predecessor mapping information from the renaming map of the issue unit's predecessor issue unit in response to the assignment unit identifying a relationship with the predecessor issue unit and final mapping information being available from the predecessor issue unit, issue an instruction block to a dependency resolution/execution unit after all register placeholders in all pre-issued instructions have been changed to point to rename registers; and a dependency resolution/execution unit further configured to receive instruction blocks from the plurality of issue units.

19. The computing system of claim 18, wherein each issue unit is configured to receive a first instruction block from the assignment unit, set each valid flag to false, pre-issue each instruction in the first instruction block by decoding each instruction and map each AV register in the decoded instruction to a register placeholder if the renaming map entry for that AV register is invalid else map the AV register in the decoded instruction to a rename register if the rename register entry is valid, and wherein pre-issuing said each instruction further refers an AV register to a register placeholder if and only if there are no instructions earlier in the instruction block which write to the AV register and the pre-issued instruction refers an AV register to a rename register if and only if the rename register is the rename register which is an assigned destination rename register for the most recent write to the AV register in the instruction block.

20. A method for deploying computer infrastructure, comprising integrating a microcode program stored in semiconductor instruction storage into a processor, wherein the program in combination with the processor is capable of performing the following:

assigning a plurality of blocks of instructions (instruction blocks) to a plurality of issue units, wherein a branch instruction ends an instruction block and each instruction block does not exceed a specified number of instructions in length;

tracking dependencies between the instruction blocks;

assigning a pointer linking a predecessor instruction block with a successor instruction block when a dependency is identified between the predecessor and successor instruction blocks, the linked instruction blocks forming a chain and instructions of the instruction blocks referencing AV registers;

mapping each AV register address in a renaming map to a rename register, each of the plurality of issue units comprising a renaming map, each renaming map comprising a valid flag for each AV register address and a plurality of register placeholders, wherein each issue unit is configured to receive a first instruction block from the assignment unit, set each valid flag to false, pre-issue each instruction in the first instruction block by decoding each instruction and map each AV register in the decoded instruction to a register placeholder if the renaming map entry for that AV register is invalid else map the AV register in the decoded instruction to a rename register if the rename register entry is valid, select a rename register to contain the results of the instruction, update the renaming map to map the AV register to the rename register, and mark the rename register entry as valid if the instruction writes to an AV register;

receiving predecessor mapping information from the renaming map of the issue unit's predecessor issue unit in response to the assignment unit identifying a relationship with the predecessor issue unit and final mapping information being available from the predecessor issue unit;

issuing an instruction block to a dependency resolution/execution unit after all register placeholders in all pre-issued instructions have been changed to point to rename registers;

receiving instruction blocks from the plurality of issue units;

holding each instruction until each rename register with an input of the instruction contains valid data;

executing the instruction when all inputs are valid; and writing the result, if any, in a rename register chosen during the pre-issue stage to hold the result.

\* \* \* \* \*